US011963231B2

United States Patent
Yuan et al.

(10) Patent No.: US 11,963,231 B2
(45) Date of Patent: Apr. 16, 2024

(54) TRANSMITTER-SIDE PROCESSING OF PREAMBLES AND REFERENCE SIGNALS

(71) Applicant: ZTE Corporation, Guangdong (CN)

(72) Inventors: Zhifeng Yuan, Guangdong (CN); Yuzhou Hu, Guangdong (CN); Weimin Li, Guangdong (CN); Hong Tang, Guangdong (CN); Jian Li, Guangdong (CN); Qiujin Guo, Guangdong (CN)

(73) Assignee: ZTE Corporation, Shenzhen (CN)

( * ) Notice: Subject to any disclaimer, the term of this patent is extended or adjusted under 35 U.S.C. 154(b) by 377 days.

(21) Appl. No.: 17/376,045

(22) Filed: Jul. 14, 2021

(65) Prior Publication Data

US 2021/0345419 A1 Nov. 4, 2021

Related U.S. Application Data

(63) Continuation of application No. PCT/CN2019/072195, filed on Jan. 17, 2019.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0048* (2013.01); *H04L 25/0202* (2013.01); *H04L 27/20* (2013.01)

(58) Field of Classification Search
CPC ......... H04W 74/0833; H04W 74/0891; H04W 72/0453; H04L 5/0048; H04L 25/0202;
(Continued)

(56) References Cited

U.S. PATENT DOCUMENTS

2009/0238126 A1 9/2009 Sato et al.
2014/0010214 A1 1/2014 Hooli et al.
(Continued)

FOREIGN PATENT DOCUMENTS

CN 103444110 A 12/2013
CN 104081872 A 10/2014
(Continued)

OTHER PUBLICATIONS

European Search Report for EP Patent Application No. 19910014.0, dated Dec. 23, 2021, 7 pages.
(Continued)

*Primary Examiner* — Thai Nguyen
(74) *Attorney, Agent, or Firm* — Perkins Coie LLP

(57) ABSTRACT

Methods, systems, and devices for transmitter-side processing of preamble and reference signals are described. An exemplary method for wireless communication includes transmitting, by a wireless device, a message comprising modified symbols that are generated by performing a modification on baseline symbols. Another exemplary method for wireless communication includes receiving, by a network node, a message comprising modified symbols that are generated by performing a modification on baseline symbols. In an example, the message may be a random access message that is part of a 2-step random access channel (RACH) process or a contention-based physical uplink shared channel (PUSCH) or physical uplink control channel (PUCCH) transmission.

25 Claims, 8 Drawing Sheets

(51) Int. Cl.
*H04L 25/02* (2006.01)
*H04L 27/20* (2006.01)

(58) Field of Classification Search
CPC ..... H04L 27/20; H04L 5/0037; H04L 5/0051; H04L 27/26025
See application file for complete search history.

(56) References Cited

U.S. PATENT DOCUMENTS

| | | |
|---|---|---|
| 2014/0321421 A1 | 10/2014 | Popovic et al. |
| 2016/0381715 A1 | 12/2016 | Lee et al. |
| 2017/0094657 A1 | 3/2017 | Yoon |
| 2018/0097591 A1 | 4/2018 | Islam et al. |
| 2019/0104435 A1 | 4/2019 | Cho et al. |
| 2021/0337597 A1* | 10/2021 | Yoshimura ............ H04W 72/23 |

FOREIGN PATENT DOCUMENTS

| | | |
|---|---|---|
| EP | 2 943 037 A1 | 11/2015 |
| WO | 2017159972 A1 | 9/2017 |
| WO | 2018085205 A1 | 5/2018 |

OTHER PUBLICATIONS

International Search Report and Written Opinion dated Oct. 22, 2019 for International Application No. PCT/CN2019/072195, filed on Jan. 17, 2019 (8 pages).
EPO, Communication pursuant to Article 94(3) EPC for European Application No. 19910014.0, dated Aug. 17, 2023, 3 pages.
CNIPA, First Office Action for Chinese Application No. 201980089384X, mailed on Nov. 28, 2023, 11 pages with unofficial translation.

* cited by examiner

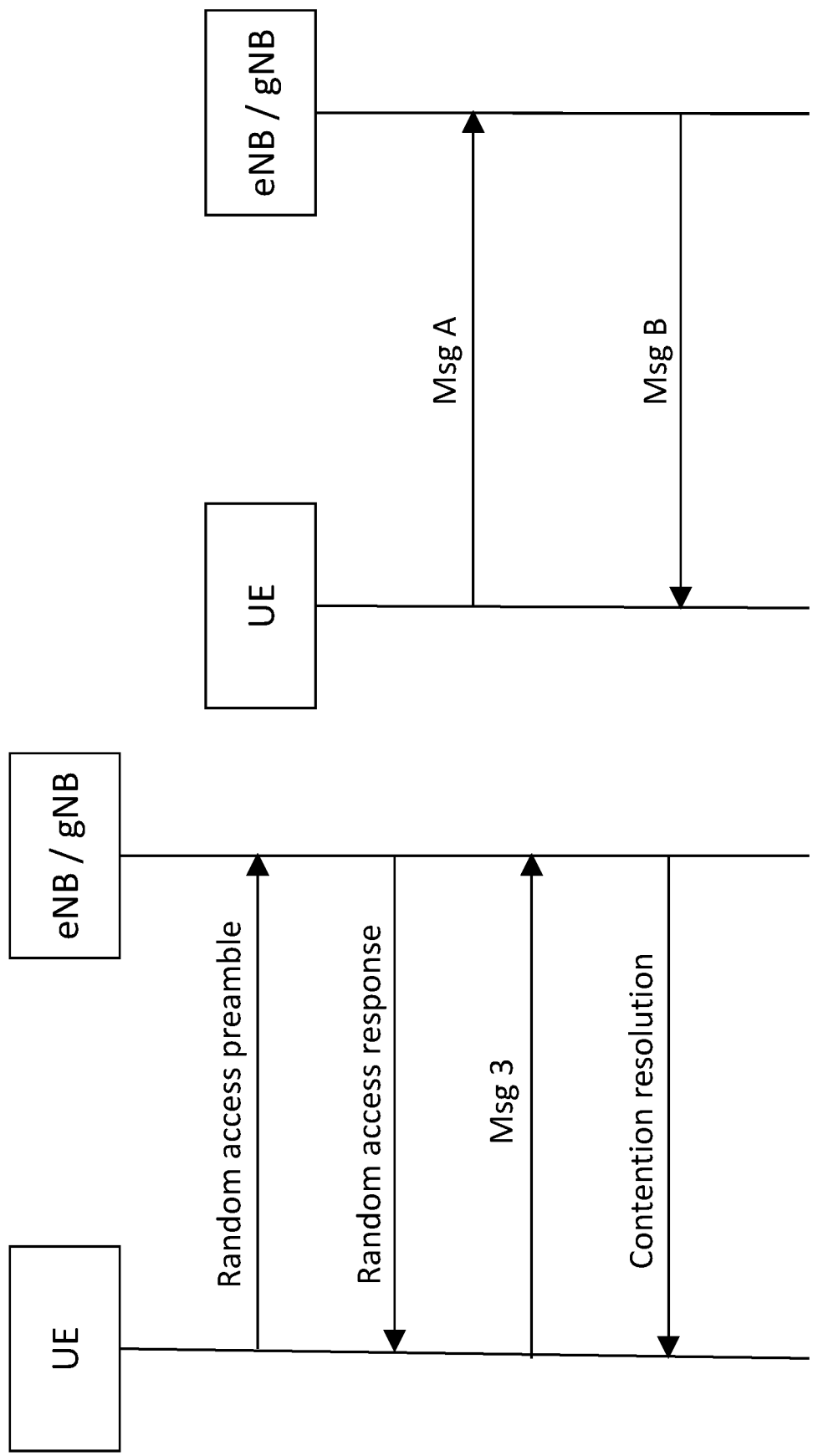

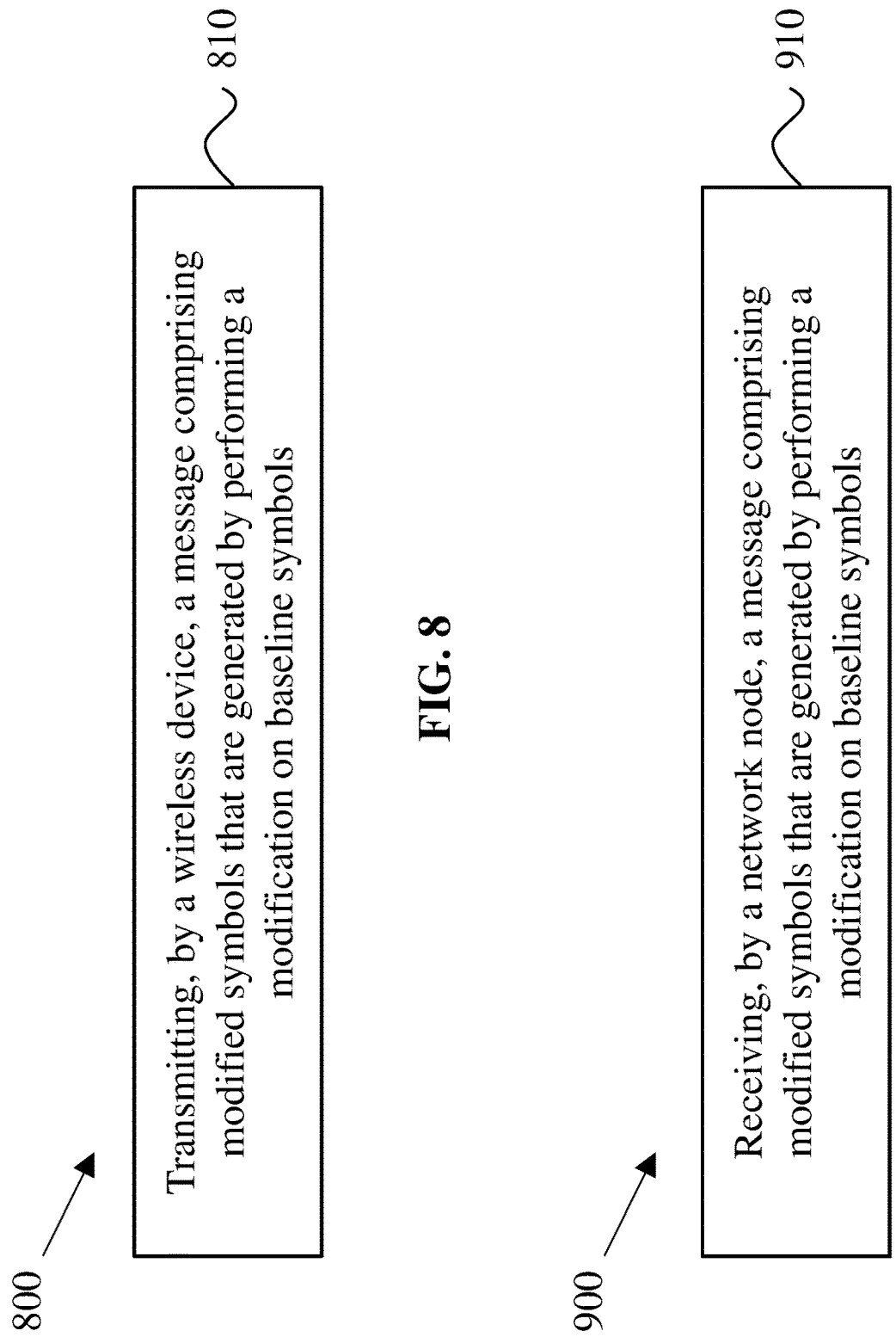

TRANSMITTER-SIDE PROCESSING OF PREAMBLES AND REFERENCE SIGNALS

CROSS-REFERENCE TO RELATED APPLICATIONS

This application is a continuation of International Patent Application No. PCT/CN2019/072195, filed on Jan. 17, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement transmitter-side processing of preambles and references signals to reduce collisions in uplink transmissions.

SUMMARY

This document relates to methods, systems, and devices for transmitter-side processing of preambles and reference signals in mobile communication technology, including 5th Generation (5G) and New Radio (NR) communication systems.

In one exemplary aspect, a wireless communication method is disclosed. The method includes transmitting, by a wireless device, a message comprising modified symbols that are generated by performing a modification on baseline symbols.

In another exemplary aspect, a wireless communication method is disclosed. The method includes receiving, by a network node, a message comprising modified symbols that are generated by performing a modification on baseline symbols.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an example of a four-step random access procedure.

FIG. 3 shows an example of a two-step random access procedure.

FIG. 8 shows a flowchart of an exemplary wireless communication method.

FIG. 9 shows a flowchart of another exemplary wireless communication method.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

Figure 1:
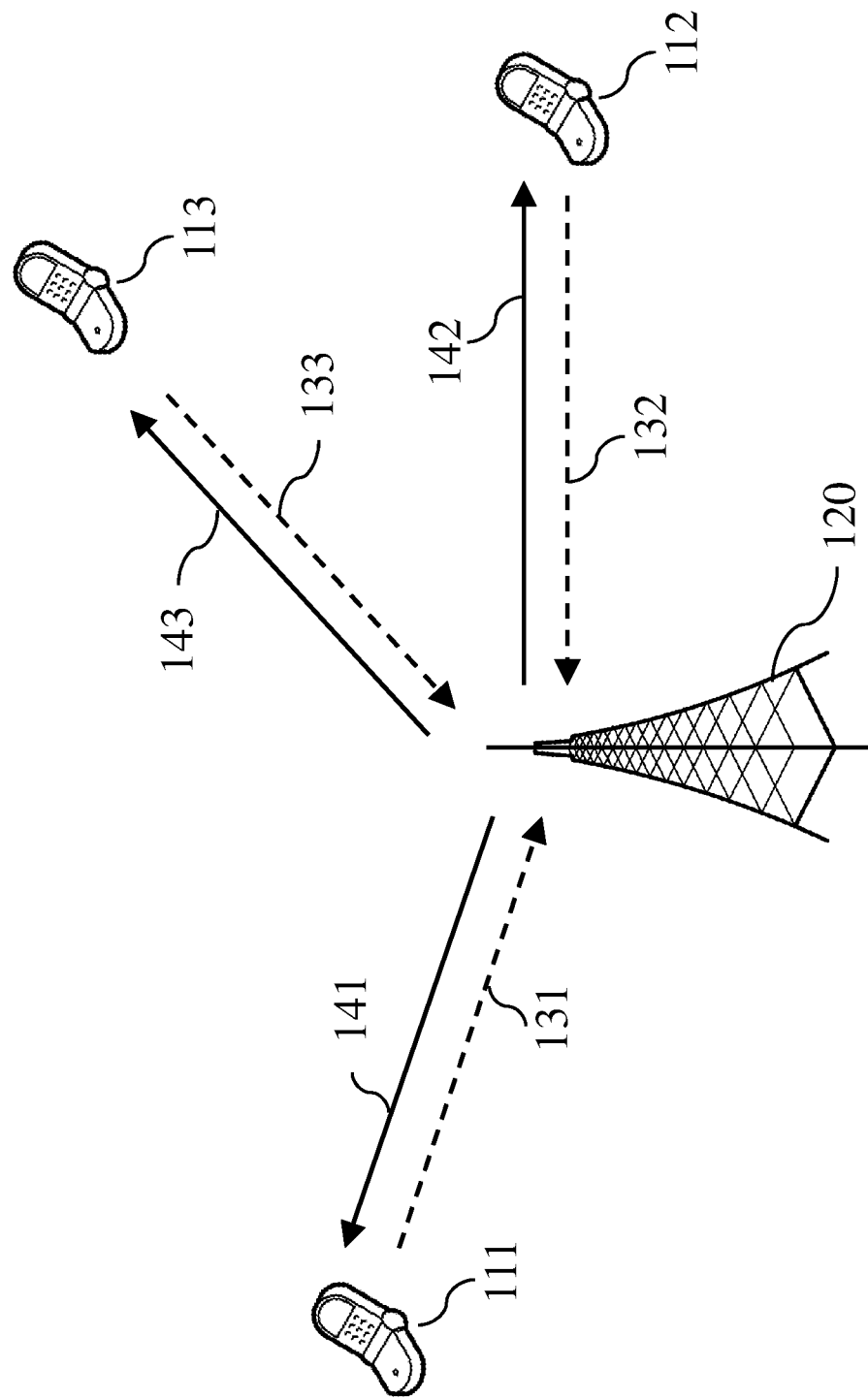
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the uplink transmissions (131, 132, 133) include a message comprising modified symbols that are generated by performing a modification on baseline symbols (e.g., preamble and DMRS sequences), as described by the presently disclosed technology. In some embodiments, the uplink transmission is a random access message, and the downlink transmissions (141, 142, 143) are the contention resolution messages send to each UE. The UE may be, for example, a smartphone, a tablet, a mobile computer, a machine to machine (M2M) device, a terminal, a mobile device, an Internet of Things (IoT) device, and so on.

In the existing LTE and NR communication systems, an uplink transmission needs to enter the RRC connected state through a random access (RACH) process for subsequent data communication. An existing implementation of the contention-based random access procedure includes four steps, as shown in FIG. 2. As shown therein, the UE transmits a random access preamble over a physical random access channel (PRACH) occasion in a first step. In a second step, the UE obtains a timing according to the information sent over the DL-SCH by the network node (e.g., base station, eNB, gNB). In some embodiments, the timing may include a timing advance (TA), which may also be called a timing adjustment amount or an arrival delay difference amount. The UE further obtains, for example, an MCS indication, and a frequency hopping indication that is associated with the third step transmission information, e.g., the uplink transmission scheduling related to Msg3. The third step is to transmit Msg3 on a physical uplink shared channel (PUSCH) according to the timing adjustment information sent by the base station and the uplink data transmission scheduling information. In some embodiments, Msg3 includes information such as a connection request and a user identifier. In a fourth step, the UE receives a contention resolution message (referred to as Msg4) that is based on the user identification information (e.g., UE ID) received by the network node.

The Msg4 (including the user identifier and the random access request response message feedback) communication to the UE is based on the PRACH, which is a specific sequence selected from the PRACH resource pool that is configured for the base station, and wherein the UE randomly selects the PRACH transmission from the configured resource pool. In some cases, there may be two UEs that select the same PRACH occasion (time/frequency position and preamble index), and the base station is unable to distinguish two UEs during the PRACH detection process. Thus, in step four, base stations rely on the user ID carried in Msg3 in the third step to identify whether or not to allow users to access successfully; if the UEs do not receive feedback comprising information associated with their own identity from the base station, the random access procedure is deemed unsuccessful.

To simplify the signaling process, UE power consumption, and other factors, the four-step process described in FIG. 2 may be simplified to the two-step process shown in FIG. 3. In some embodiments, the random access preamble and Msg3 are merged into MsgA, and the contention resolution and some random access responses are similarly combined in MsgB. The content contained in the original messages (e.g., frequency hopping information, retransmission information, etc.) is merged into MsgB.

For the frame structure of the MsgA transmitted on the PUSCH, user detection and channel estimation may be performed using a preamble or a reference signal (RS, e.g., a demodulation reference signal (DMRS)) or jointly. Embodiments of the presently disclosed technology define a mapping relationship between the preamble and the combination of DMRS antenna port and PUSCH resources, which is inherent in the channel structure design of the 2-step RACH process or the contention-based PUSCH transmission. The user may perform downlink feedback on the decoding result of the PUSCH. For example, the RA-RNTI carried by the preamble may be used to scramble the user feedback information. However, if the mapping between the preamble (or DMRS) and the RS is predetermined, then once the preamble (or DMRS) selected by the user is the same as that selected by another user, the preamble (or DMRS) generates a "collision" and adversely impact channel estimation since channel estimate is representative of multiple users, instead of just a single user. Thus, the combined channel will directly affect demodulation, thereby deteriorating performance.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Examples of Transmitter-Side Processing of Preambles and DMRS

Embodiments of the presently disclosed technology apply an equivalent "precoding" or (orthogonal) cover code process to the preamble and the DMRS at the transmitting end to improve the channel estimation on the receiving side in the "collision" scenario described above. That is, the preamble or the DMRS is multiplied by a coefficient at the transmitting side, the channels estimated based on the preamble and the DMRS are multiplied by the coefficients on the receiving side, and finally combined to obtain improved channel estimation performance under collision. This operation of multiplying the coefficient on the transmitting side may be interpreted as equivalent precoding or (orthogonal) cover code process, and the corresponding processing on the receiving side can be interpreted as beamforming or despreading with an (orthogonal) cover code.

Figure 4:
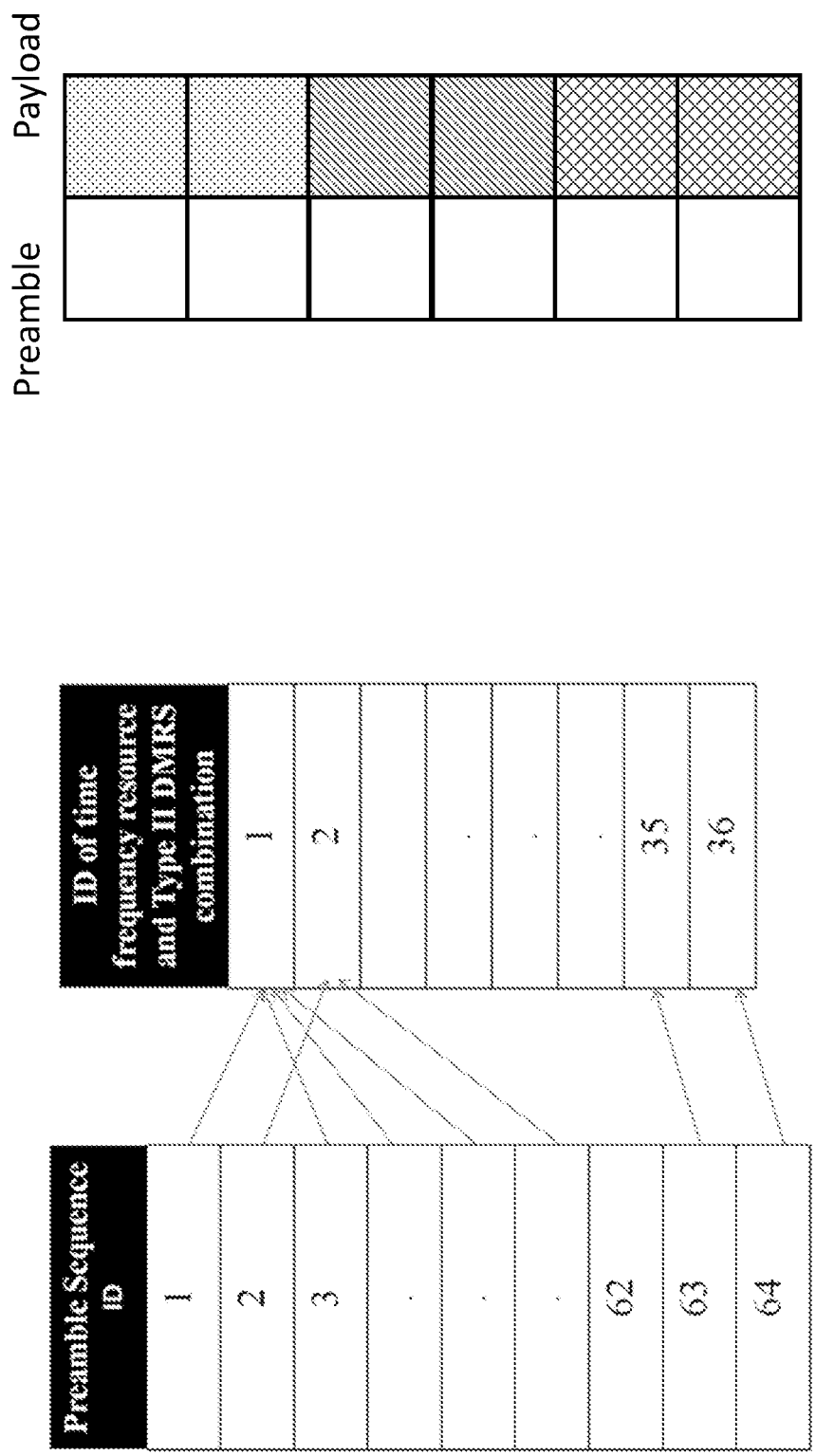
FIG. 4 shows an example of a mapping between preamble IDs and IDs of a time-frequency resource and Type II DMRS combinations.
Figure 6:
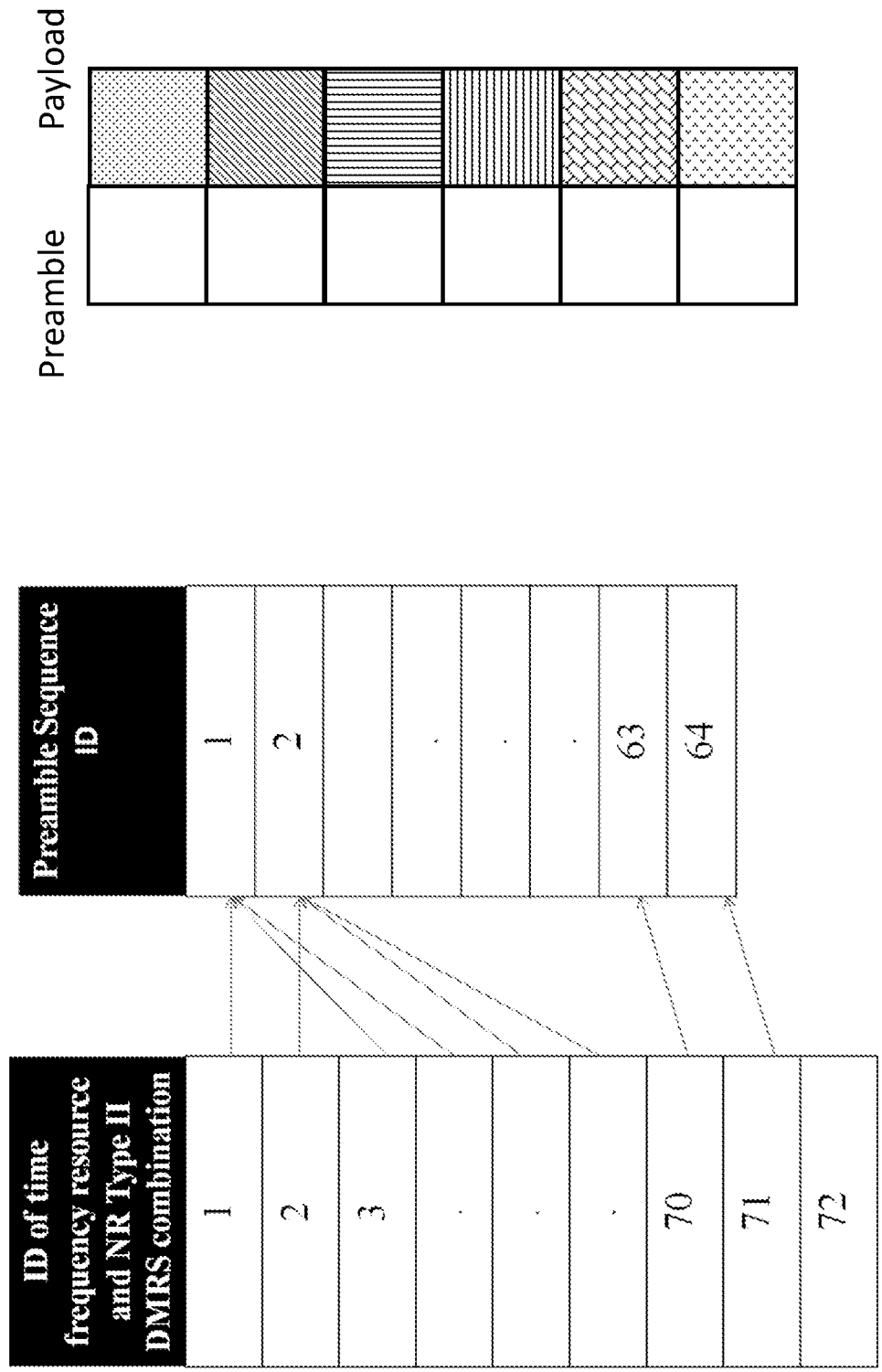
FIG. 6 shows yet another example of a mapping between preamble IDs and IDs of a time-frequency resource and Type II DMRS combinations.

Embodiment 1. In some embodiments, it is assumed that the size of preamble pool for UE performing 2-step RACH or contention-based PUSCH transmission is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 20 and 40 preamble-DMRS 1-to-1 mapping pairs respectively. In this example, NR type II DMRS is adopted and there are $12*N_{RB}$ DMRS/RB pairs. Given that the preamble and PUSCH are not far from each other at the transmitter side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set {[1,1], [1,−1]} to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,−1], then at the receiving side, the channel of users 1 and 2 can be solved as (1/2)×(hp+hd) and (1/2)×(hp−hd), respectively.

In some embodiments, and even when no UE has collided and a certain UE have chosen either of the sets [1,1] or [1,−1], on the receiver side, the channel of the UE can also be obtained with 1/2(hp+hd) and 1/2(hp-hd) respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [1/2, 1/2], [1/2, −1/2], [0, 1], [1, 0], [0,−1]. When the UE has been successfully decoded, the HARQ-ACK feedback or contention resolution message includes at least one of the following:

An index of the preamble sequence, with the CRC is scrambled by the UE ID

Figure 5:
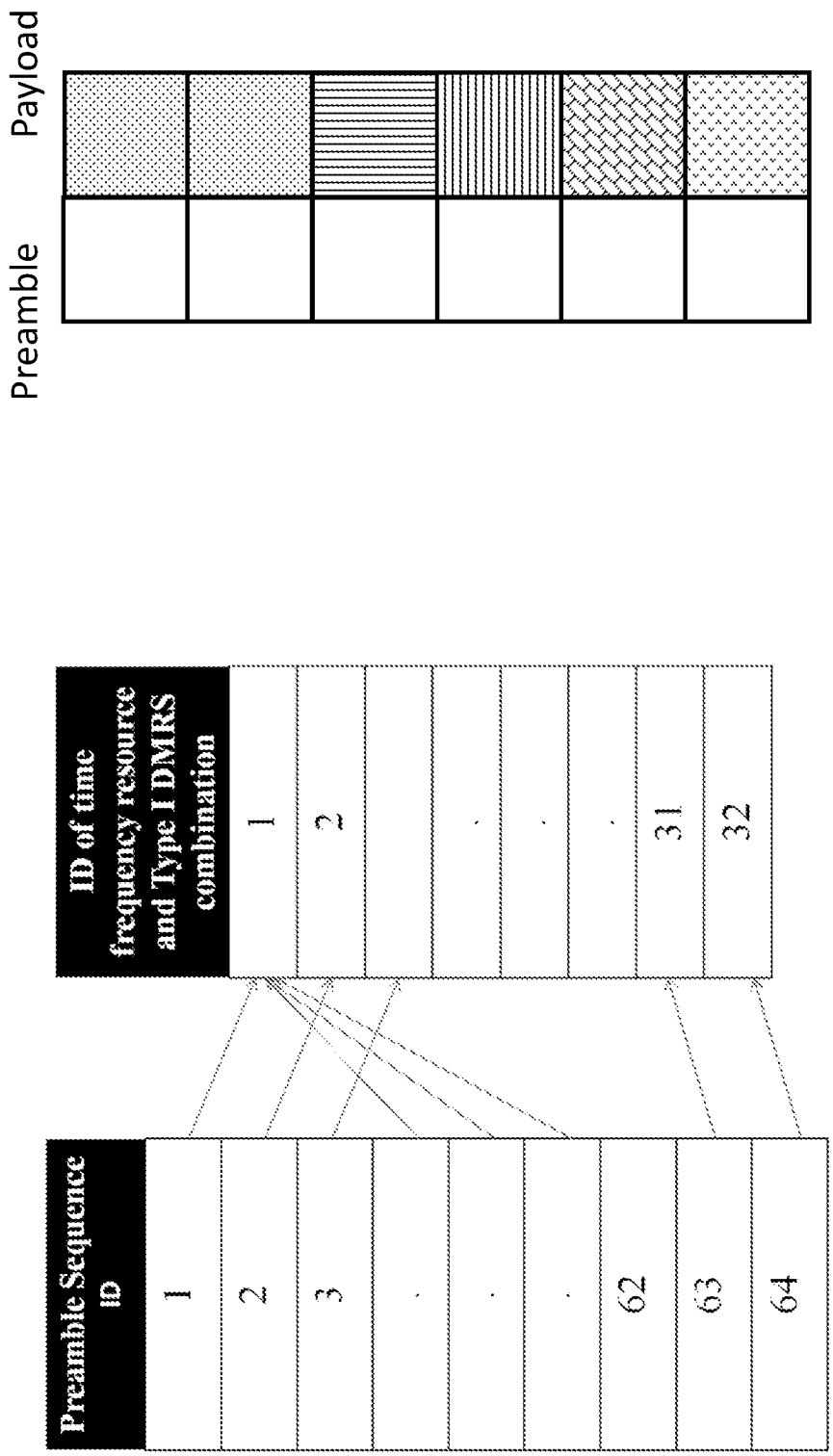
FIG. 5 shows another example of a mapping between preamble IDs and IDs of a time-frequency resource and Type I DMRS combinations.
Figure 7:
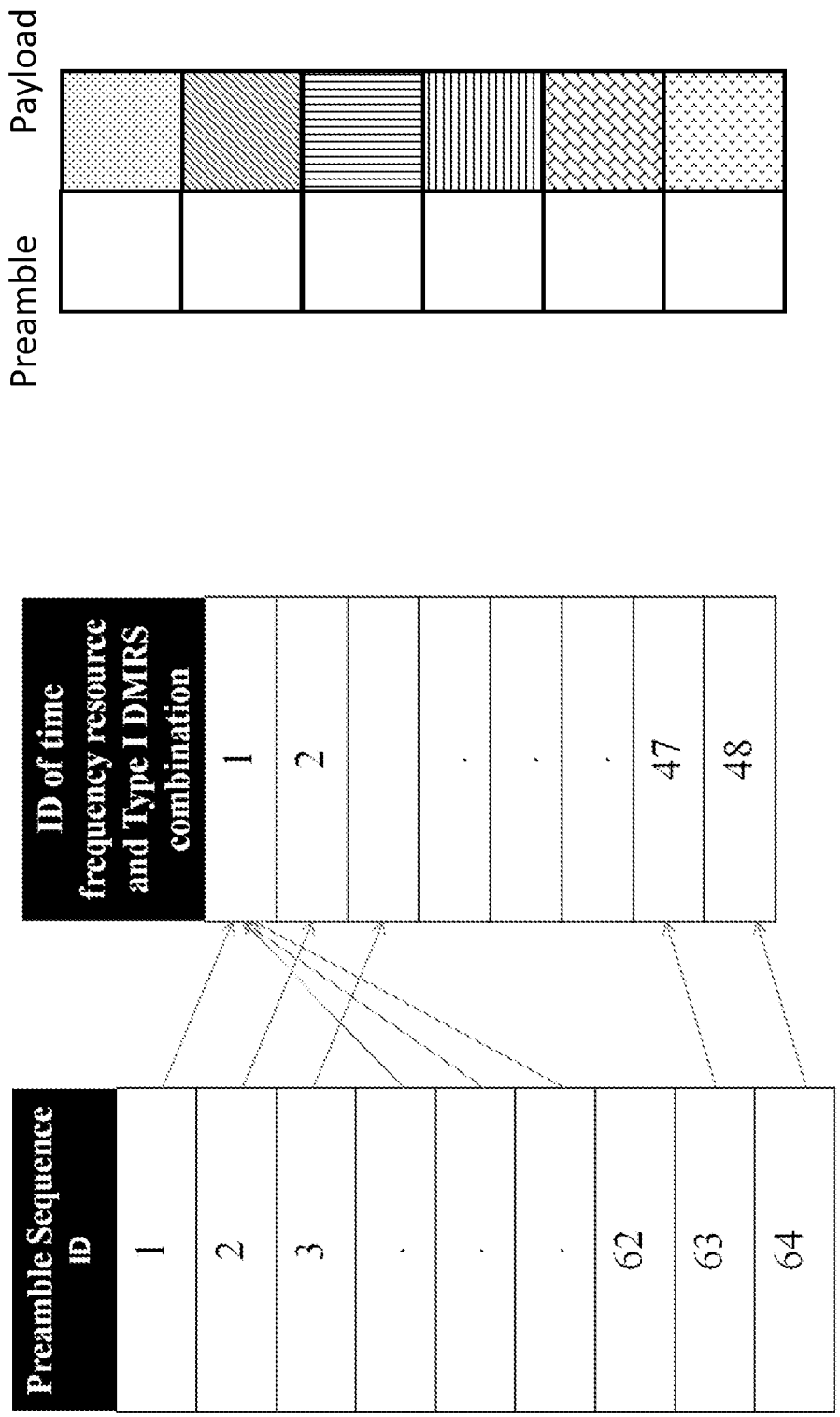
FIG. 7 shows yet another example of a mapping between preamble IDs and IDs of a time-frequency resource and Type I DMRS combinations.

An index of the payload occasion (e.g., an index of the combination {DMRS, resource block set}), with the CRC is scrambled by the UE ID The UE ID itself Embodiment 2. In some embodiments, it is assumed that the size of preamble pool for UE performing 2-step RACH and contention-based PUSCH is 64 and channel structure and preamble PUSCH mapping relationship is as shown in FIG. 5 and FIG. 7. An exemplary preamble and payload transmission occasion (e.g., with either distinct DMRS port or time frequency resource position) mapping relationship is illustrated in FIG. 5 and FIG. 7, wherein there exist 16 and 32 preamble-DMRS 1-to-1 mapping pairs respectively. In this example, NR type I DMRS is adopted and there are $8*N_{RB}$ DMRS/RB pairs. Given that the preamble and PUSCH are not far from each other at the transmitter side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively. For the case where A or B equals to 1, there is no modification to the preamble or DMRS, respectively, at least for the 1-to-1 mapping pairs. In an example, the UE randomly chooses from the set {[1,1], [1,−1]} to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,−1], then at the receiving side, the channel of users 1 and 2 can be solved as 1/2(hp+hd) and 1/2(hp−hd), respectively.

In some embodiments, and even when no UE has collided and a certain UE have chosen either of the sets [1,1] or [1,−1], on the receiver side, the channel of the UE can also be obtained with 1/2(hp+hd) and 1/2(hp−hd) respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [1/2, 1/2], [1/2, −1/2], [0, 1], [1, 0] or [0, −1]. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 3. In some embodiments, it is assumed that the size of preamble pool for UE performing 2-step RACH and contention-based PUSCH is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 20 and 40 preamble-DMRS 1-to-1 mapping pairs respectively. In this example, NR type II DMRS is adopted and there are $12*N_{RB}$ DMRS/RB pairs. Given that the preamble and PUSCH are not far from each other at the transmitter side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set {[1,1], [1,i]} to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,i], then at the receiving side, the channel of users 1 and 2 can be solved as (i/(i−1))×hp+(1/(1−i))×hd and (1/(1−i))×hp+(1/(i−1))×hd, respectively.

In some embodiments, and even when no UE has collided and a certain UE have chosen either of the sets [1,1] or [1,i], on the receiver side, the channel of the UE can also be obtained with 1/2(hp+hd) and 1/2(hp−i*hd) respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [i/(i−1), 1/(1−i)], [1/(1−i), 1/(i−1)], [1/2, 1/2], [1/2, −i/2], [0, 1], [1, 0] or [0,−i]. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 4. In some embodiments, it is assumed that the size of preamble pool for UE performing 2-step RACH and contention-based PUSCH transmission is 64 and channel structure and preamble PUSCH mapping relationship is as shown in FIG. 5 and FIG. 7. An exemplary preamble and payload transmission occasion (e.g., with either distinct DMRS port or time frequency resource position) mapping relationship is illustrated in FIG. 5 and FIG. 7, wherein there exist 16 and 32 preamble-DMRS 1-to-1 mapping pairs respectively. In this example, NR type II DMRS is adopted and there are $8*N_{RB}$ DMRS/RB pairs. Given that the preamble and PUSCH are not far from each other at the transmitter side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there. is no modification to the preamble or DMRS, respectively. In an example, the UE randomly chooses from the set $\{[1, 1], [1, i]\}$ to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1, 1] and user 2 having chosen [1, i], then at the receiving side, the channel of users 1 and 2 can be solved as $(i/(i-1))\times hp+(1/(1-i))\times hd$ and $(1/(1-i))\times hp+(1/(i-1))\times hd$, respectively.

In some embodiments, and even when no UE has collided and a certain UE have chosen either of the sets [1, 1] or [1, i], on the receiver side, the channel of the UE can also be obtained with $1/2(hp+hd)$ and $1/2\times hp-i/2\times hd$ respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: $[i/(i-1), 1/(1-i)]$, $[1/(1-i), 1/(i-1)]$, $[1/2, 1/2]$, $[1/2, -i/2]$, $[0, 1]$, $[1, 0]$ or $[0,-i]$. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 5. In some embodiments, it is assumed that the size of preamble pool for UE performing 2-step RACH and contention-based PUSCH transmission is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 20 and 40 preamble-DMRS 1-to-1 mapping pairs respectively. In this example, NR type II DMRS is adopted and there are $12*N_{RB}$ DMRS/RB pairs. Given that the preamble and PUSCH are not far from each other at the transmission side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set $\{[1,1], [1,-i]\}$ to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,-i], then at the receiving side, the channel of users 1 and 2 can be solved as $(i/(1+i))\times hp+(1/(1+i))\times hd$ and $(1/(1+i))\times hp-(1/(1+i))\times hd$, respectively.

In some embodiments, and even when no UE has collided and a certain UE have chosen either of the sets [1,1] or [1,-i], on the receiver side, the channel of the UE can also be obtained with $1/2(hp+hd)$ and $1/2\times hp+i/2\times hd$ respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: $[i/(1+i), 1/(1+i)]$, $[1/(1+i), -1/(1+i)]$, $[1/2, 1/2]$, $[1/2, i/2]$, $[0, 1]$, $[1, 0]$ or $[0,i]$. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 6. In some embodiments, it is assumed that the size of preamble pool for UE performing 2-step RACH and contention-based PUSCH transmission is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 16 and 32 preamble-DMRS 1-to-1 mapping pairs respectively. In this example, NR type II DMRS is adopted and there are 8*NRB DMRS/RB pairs. Given that the preamble and PUSCH are not far from each other at the transmitter side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set $\{[1,1], [1,-i]\}$ to perform a modification to the preamble or DMRS (including [1,1] where there is no modification). If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,−i], then at the receiving side, the channel of users 1 and 2 can be solved as (i/(1+i))×hp+(1/(1+i))×hd and (1/(1+i))×hp−(1/(1+i))×hd, respectively.

In some embodiments, and even when no UE has collided and a certain UE have chosen either of the sets [1,1] or [1,−i], on the receiver side, the channel of the UE can also be obtained with 1/2(hp+hd) and 1/2×hp+i/2×hd respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [i/(1+i), 1/(1+i)], [l/(1+i), −1/(1+i)], [1/2, 1/2], [1/2, i/2], [0, 1], [1, 0] or [0,i]. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 7. In some embodiments, it is assumed that the size of preamble pool for UE performing 2-step RACH and contention based PUSCH transmission is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 20 and 40 preamble-DMRS 1-to-1 mapping pairs respectively. In this example, NR type II DMRS is adopted and there are $12*N_{RB}$ DMRS/RB pairs. Given that the preamble and PUSCH are not far from each other at the transmission side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set {[1,1], [1,x]} to perform a modification to the preamble or DMRS (including [1,1] where there is no modification) at least for the 1-to-1 mapping pairs. If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,x], then at the receiving side, the channel of users 1 and 2 can be solved as (x/(x−1))×hp+(1/(1−x))×hd and (1/(1−x))×hp+(1/(x−1))×hd, respectively.

In some embodiments, and even when no UE has collided and a certain UE have chosen either of the sets [1,1] or [1,x], on the receiver side, the channel of the UE can also be obtained with 1/2(hp+hd) and 1/2×hp+1/(2x)×hd respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [x/(x−1), 1/(1−x)], [1/(1−x), 1/(x−1)], [1/2, 1/2], [1/2, 1/(2*x)], [0, 1], [1, 0] or [0,1/x]. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 8. In some embodiments, it is assumed that the size of preamble pool for UE performing 2-step RACH and contention based PUSCH transmission is 64 and channel structure and preamble PUSCH mapping relationship is as shown in FIG. 4 and FIG. 6. An exemplary preamble and payload transmission occasion (e.g., with either distinct DMRS port or time frequency resource position) mapping relationship is illustrated in FIG. 4 and FIG. 6, wherein there exist 16 and 32 preamble-DMRS 1-to-1 mapping pairs respectively. In this example, NR type I DMRS is adopted and there are $8*N_{RB}$ DMRS/RB pairs. Given that the preamble and PUSCH are not far from each other at the transmission side, the channel estimated from either preamble, DMRS or the average of the estimated channel can be leveraged to perform equalization for the UE. From the transmitter side perspective, the UE could choose to perform a modification to the preamble and DMRS by means of a complex multiplication with complex numbers A and B, respectively, at least for the 1-to-1 mapping pairs. For the case where A or B equals to 1, there is no modification to the preamble or DMRS, respectively. In an example, the UE randomly chooses from the set {[1,1], [1,x]} to perform a modification to the preamble or DMRS (including [1,1] where there is no modification) at least for the 1-to-1 mapping pairs. If the channel estimated from the preamble and DMRS are denoted hp and hd respectively, and if two UEs have chosen the same preamble and DMRS pair and different modifications within the set, e.g., user 1 having chosen [1,1] and user 2 having chosen [1,x], then at the receiving side, the channel of users 1 and 2 can be solved as (x/(x−1))×hp+(1/(1−x))×hd and (1/(1−x))×hp+(1/(x−1))×hd, respectively.

In some embodiments, and even when no UE has collided and a certain UE have chosen either of the sets [1,1] or [1,x], on the receiver side, the channel of the UE can also be obtained with 1/2(hp+hd) and 1/2×hp+1/(2x)×hd respectively, which is the average of the channel estimated by preamble and DMRS. When preamble and PUSCH are frequency-division multiplexed (FDM) or time-division multiplexed (TDM) with a larger timing offset, the channel estimated from the DMRS is preferred. However, when preamble and PUSCH share the same bandwidth and are close to each other, the channel estimated from preamble may be preferred given that received SNR of the preamble is likely to be higher than that of the DMRS.

At the receiving end, the channel estimated from the preamble and DMRS can be leveraged to perform the channel refinement or collision resolution by performing the inner product of [hp, hd] and at least one of the following: [x/(x−1), 1/(1−x)], [1/(1−x), 1/(x−1)], [1/2, 1/2], [1/2, 1/(2x)], [0, 1], [1, 0] or [0,1/x]. When the UE has been successfully decoded, the HARQ-ACK feedback or contention resolution message includes at least one of the following:

An index of the preamble sequence, with the CRC is scrambled by the UE ID

An index of the payload occasion (e.g., an index of the combination {DMRS, resource block set}), with the CRC is scrambled by the UE ID The UE ID itself Embodiment 9. In some embodiments, the modified DMRS symbols may be generated using Table I enumerated below, wherein the first, second and third parts of the table have been modified based on the modification sets {[1, 1], [1, −1]}, {[1, 1], [1, i]} or {[1, 1], [1, −i]}, respectively. The UE can choose from the union set of at least two of the previous modification sets, e.g., {[1,1], [1,−1], [1,i], [1, −i]}. To alleviate the blind detection efforts at the base stations, the set chosen by the UE is mapped explicitly or implicitly to the payload transmission occasions. An example of implicit indication may include leveraging already existed mapping relationships in the specification, such as the SSB preamble mapping. By further establishing a mapping between SSB and modification set ID, different modification set IDs can therefore be mapped to different payload transmission occasions. An example of explicit indication may include directly establishing the mapping relationship between the set ID and the payload transmission occasions. For an NR system, the modifications described in the above embodiments are applicable, and some examples are shown in Tables II-V. For an LTE system, the modifications described in the above embodiments are applicable, and the exemplary {1,−1} modification is shown in Tables VIA and VIB.

TABLE I

Parameters reflecting operations to existing PUSCH DM-RS configuration table

| P Set ID ($N_{ID}^{Set}$) | P inner-Set ID ($N_{ID}^{SetID}$) | $w_{f,\ additional}(k')$ | | $w_{t,\ additional}(l')$ | |
|---|---|---|---|---|---|
| | | k'= 0 | k'= 1 | l' = 0 | l' = 1 |
| 0 | 0 | 1 | 1 | 1 | 1 |
| | 1 | −1 | −1 | 1 | 1 |
| | 2 | 1 | 1 | −1 | −1 |
| | 3 | −1 | 1 | 1 | 1 |
| | 4 | 1 | 1 | −1 | 1 |
| 1 | 0 | 1 | 1 | 1 | 1 |
| | 1 | −i | −i | 1 | 1 |
| | 2 | 1 | 1 | −i | −i |
| 2 | 0 | 1 | 1 | 1 | 1 |
| | 1 | i | i | 1 | 1 |
| | 2 | 1 | 1 | i | i |

| $\tilde{p}$ | CDM group | Δ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |

TABLE I-continued

Parameters reflecting operations to existing PUSCH DM-RS configuration table

| 2 | 1 | 1 | +1 | +1 | +1 | +1 |
|---|---|---|---|---|---|---|
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | +1 |
| 7 | 1 | 1 | +1 | −1 | +1 | +1 |
| 8 | 0 | 0 | −1 | −1 | +1 | +1 |
| 9 | 0 | 0 | −1 | +1 | +1 | +1 |
| 10 | 1 | 1 | −1 | −1 | +1 | +1 |
| 11 | 1 | 1 | −1 | +1 | +1 | +1 |
| 12 | 0 | 0 | −1 | −1 | +1 | −1 |
| 13 | 0 | 0 | −1 | +1 | +1 | −1 |
| 14 | 1 | 1 | −1 | −1 | +1 | −1 |
| 15 | 1 | 1 | −1 | +1 | +1 | −1 |
| 16 | 0 | 0 | +1 | +1 | −1 | +1 |
| 17 | 0 | 0 | +1 | −1 | −1 | +1 |
| 18 | 1 | 1 | +1 | +1 | −1 | −1 |
| 19 | 1 | 1 | +1 | −1 | −1 | −1 |
| 20 | 0 | 0 | +1 | +1 | −1 | +1 |
| 21 | 0 | 0 | +1 | −1 | −1 | +1 |
| 22 | 1 | 1 | +1 | +1 | −1 | +1 |
| 23 | 1 | 1 | +1 | −1 | −1 | +1 |
| 24 | 0 | 0 | −1 | +1 | +1 | +1 |
| 25 | 0 | 0 | −1 | −1 | +1 | +1 |
| 26 | 1 | 1 | −1 | +1 | +1 | +1 |
| 27 | 1 | 1 | −1 | −1 | +1 | +1 |
| 28 | 0 | 0 | −1 | −1 | +1 | −1 |
| 29 | 0 | 0 | −1 | −1 | +1 | −1 |
| 30 | 1 | 1 | −1 | −1 | +1 | −1 |
| 31 | 1 | 1 | −1 | −1 | +1 | −1 |
| 32 | 0 | 0 | +1 | +1 | −1 | +1 |
| 33 | 0 | 0 | +1 | −1 | −1 | +1 |
| 34 | 1 | 1 | +1 | +1 | −1 | +1 |
| 35 | 1 | 1 | +1 | −1 | −1 | +1 |
| 36 | 0 | 0 | +1 | +1 | −1 | −1 |
| 37 | 0 | 0 | +1 | −1 | −1 | −1 |
| 38 | 1 | 1 | +1 | +1 | −1 | −1 |
| 39 | 1 | 1 | +1 | −1 | −1 | −1 |

TABLE II

Exemplary transmitter-side processing of preambles and DMRS sequences

| $\tilde{p}$ | CDM group | Δ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |
| 12 | 0 | 0 | −i | −i | +1 | +1 |
| 13 | 0 | 0 | −i | +i | +1 | +1 |
| 14 | 1 | 2 | −i | −i | +1 | +1 |
| 15 | 1 | 2 | −i | +i | +1 | +1 |
| 16 | 2 | 4 | −i | −i | +1 | +1 |
| 17 | 2 | 4 | −i | +i | +1 | +1 |
| 18 | 0 | 0 | −i | −i | +1 | −1 |
| 19 | 0 | 0 | −i | +i | +1 | −1 |
| 20 | 1 | 2 | −i | −i | +1 | −1 |
| 21 | 1 | 2 | −i | +i | +1 | −1 |
| 22 | 2 | 4 | −i | −i | +1 | −1 |
| 23 | 2 | 4 | −i | +i | +1 | −1 |
| 24 | 0 | 0 | +1 | +1 | −i | −i |
| 25 | 0 | 0 | +1 | −1 | −i | −i |

TABLE II-continued

Exemplary transmitter-side processing of preambles and DMRS sequences

| $\tilde{p}$ | CDM group | Δ | $w_f(k')$ k'=0 | $w_f(k')$ k'=1 | $w_t(l')$ l'=0 | $w_t(l')$ l'=1 |
|---|---|---|---|---|---|---|
| 26 | 1 | 2 | +1 | +1 | −i | −i |
| 27 | 1 | 2 | +1 | −1 | −i | −i |
| 28 | 2 | 4 | +1 | +1 | −i | −i |
| 29 | 2 | 4 | +1 | −1 | −i | −i |
| 30 | 0 | 0 | +1 | +1 | −i | +i |
| 31 | 0 | 0 | +1 | −1 | −i | +i |
| 32 | 1 | 2 | +1 | +1 | −i | +i |
| 33 | 1 | 2 | +1 | −1 | −i | +i |
| 34 | 2 | 4 | +1 | +1 | −i | +i |
| 35 | 2 | 4 | +1 | −1 | −i | +i |

TABLE III

Exemplary transmitter-side processing of preambles and DMRS sequences

| $\tilde{p}$ | CDM group | Δ | $w_f(k')$ k'=0 | $w_f(k')$ k'=1 | $w_t(l')$ l'=0 | $w_t(l')$ l'=1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |
| 12 | 0 | 0 | i | i | +1 | +1 |
| 13 | 0 | 0 | i | −i | +1 | +1 |
| 14 | 1 | 2 | i | i | +1 | +1 |
| 15 | 1 | 2 | i | −i | +1 | +1 |
| 16 | 2 | 4 | i | i | +1 | +1 |
| 17 | 2 | 4 | i | −i | +1 | +1 |
| 18 | 0 | 0 | i | i | +1 | −1 |
| 19 | 0 | 0 | i | −i | +1 | −1 |
| 20 | 1 | 2 | i | i | +1 | −1 |
| 21 | 1 | 2 | i | −i | +1 | −1 |
| 22 | 2 | 4 | i | i | +1 | −1 |
| 23 | 2 | 4 | i | −i | +1 | −1 |
| 24 | 0 | 0 | +1 | +1 | i | i |
| 25 | 0 | 0 | +1 | −1 | i | i |
| 26 | 1 | 2 | +1 | +1 | i | i |
| 27 | 1 | 2 | +1 | −1 | i | i |
| 28 | 2 | 4 | +1 | +1 | i | i |
| 29 | 2 | 4 | +1 | −1 | i | i |
| 30 | 0 | 0 | +1 | +1 | i | −i |
| 31 | 0 | 0 | +1 | −1 | i | −i |
| 32 | 1 | 2 | +1 | +1 | i | −i |
| 33 | 1 | 2 | +1 | −1 | i | −i |
| 34 | 2 | 4 | +1 | +1 | i | −i |
| 35 | 2 | 4 | +1 | −1 | i | −i |

TABLE IV

Exemplary transmitter-side processing of preambles and DMRS sequences

| $\tilde{p}$ | CDM group | Δ | $w_f(k')$ k'=0 | $w_f(k')$ k'=1 | $w_t(l')$ l'=0 | $w_t(l')$ l'=1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |
| 12 | 0 | 0 | −1 | −1 | +1 | +1 |
| 13 | 0 | 0 | −1 | +1 | +1 | +1 |
| 14 | 1 | 1 | −1 | −1 | +1 | +1 |
| 15 | 1 | 1 | −1 | +1 | +1 | +1 |
| 16 | 0 | 0 | −1 | −1 | +1 | +1 |
| 17 | 0 | 0 | −1 | +1 | +1 | +1 |
| 18 | 1 | 1 | −1 | −1 | +1 | −1 |
| 19 | 1 | 1 | −1 | +1 | +1 | −1 |
| 20 | 0 | 0 | −1 | −1 | +1 | −1 |
| 21 | 0 | 0 | −1 | +1 | +1 | −1 |
| 22 | 1 | 1 | −1 | −1 | +1 | −1 |
| 23 | 1 | 1 | −1 | +1 | +1 | −1 |
| 24 | 0 | 0 | +1 | +1 | −1 | −1 |
| 25 | 0 | 0 | +1 | −1 | −1 | −1 |
| 26 | 1 | 1 | +1 | +1 | −1 | −1 |
| 27 | 1 | 1 | +1 | −1 | −1 | −1 |
| 28 | 0 | 0 | +1 | +1 | −1 | −1 |
| 29 | 0 | 0 | +1 | −1 | −1 | −1 |
| 30 | 1 | 1 | +1 | +1 | −1 | +1 |
| 31 | 1 | 1 | +1 | −1 | −1 | +1 |
| 32 | 0 | 0 | +1 | +1 | −1 | +1 |
| 33 | 0 | 0 | +1 | −1 | −1 | +1 |
| 34 | 1 | 1 | +1 | +1 | −1 | +1 |
| 35 | 1 | 1 | +1 | −1 | −1 | +1 |
| 36 | 0 | 0 | −1 | −1 | +1 | +1 |
| 37 | 0 | 0 | −1 | −1 | +1 | +1 |
| 38 | 1 | 1 | −1 | +1 | +1 | +1 |
| 39 | 0 | 0 | −1 | −1 | +1 | +1 |
| 40 | 0 | 0 | −1 | −1 | +1 | +1 |
| 41 | 1 | 1 | −1 | −1 | +1 | +1 |
| 42 | 1 | 1 | −1 | +1 | +1 | −1 |
| 43 | 0 | 0 | −1 | −1 | +1 | −1 |
| 44 | 0 | 0 | −1 | +1 | +1 | −1 |
| 45 | 1 | 1 | −1 | −1 | +1 | −1 |
| 46 | 1 | 1 | −1 | +1 | +1 | −1 |
| 47 | 0 | 0 | −1 | −1 | +1 | −1 |
| 48 | 0 | 0 | +1 | +1 | −1 | +1 |
| 49 | 1 | 1 | +1 | −1 | −1 | +1 |
| 50 | 1 | 1 | +1 | +1 | −1 | +1 |
| 51 | 0 | 0 | +1 | −1 | −1 | +1 |
| 52 | 0 | 0 | +1 | −1 | −1 | +1 |
| 53 | 1 | 1 | +1 | −1 | −1 | +1 |
| 54 | 1 | 1 | +1 | +1 | −1 | −1 |
| 55 | 0 | 0 | +1 | −1 | −1 | −1 |
| 56 | 0 | 0 | +1 | +1 | −1 | −1 |
| 57 | 1 | 1 | +1 | −1 | −1 | −1 |
| 58 | 1 | 1 | +1 | −1 | −1 | −1 |
| 59 | 0 | 0 | +1 | −1 | −1 | −1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |
| 8 | 0 | 0 | −i | −i | +1 | +1 |
| 9 | 0 | 0 | −i | +i | +1 | +1 |
| 10 | 1 | 1 | −i | −i | +1 | +1 |
| 11 | 1 | 1 | −i | +i | +1 | +1 |
| 12 | 0 | 0 | −i | −i | +1 | −1 |
| 13 | 0 | 0 | −i | +i | +1 | −1 |
| 14 | 1 | 1 | −i | −i | +1 | −1 |

TABLE IV-continued

Exemplary transmitter-side processing of preambles and DMRS sequences

| $\tilde{p}$ | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 15 | 1 | 1 | −i | +i | +1 | −1 |
| 16 | 0 | 0 | +1 | +1 | −i | −i |
| 17 | 0 | 0 | +1 | −1 | −i | −i |
| 18 | 1 | 1 | +1 | +1 | −i | −i |
| 19 | 1 | 1 | +1 | −1 | −i | −i |
| 20 | 0 | 0 | +1 | +1 | −i | +i |
| 21 | 0 | 0 | +1 | −1 | −i | +i |
| 22 | 1 | 1 | +1 | +1 | −i | +i |
| 23 | 1 | 1 | +1 | −1 | −i | +i |

TABLE V

Exemplary transmitter-side processing of preambles and DMRS sequences

| $\tilde{p}$ | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |
| 8 | 0 | 0 | i | i | +1 | +1 |
| 9 | 0 | 0 | i | −i | +1 | +1 |
| 10 | 1 | 1 | i | i | +1 | +1 |
| 11 | 1 | 1 | i | −i | +1 | +1 |
| 12 | 0 | 0 | i | i | +1 | −1 |
| 13 | 0 | 0 | i | −i | +1 | −1 |
| 14 | 1 | 1 | i | i | +1 | −1 |
| 15 | 1 | 1 | i | −i | +1 | −1 |
| 16 | 0 | 0 | +1 | +1 | i | i |
| 17 | 0 | 0 | +1 | −1 | i | i |
| 18 | 1 | 1 | +1 | +1 | i | i |
| 19 | 1 | 1 | +1 | −1 | i | i |
| 20 | 0 | 0 | +1 | +1 | i | −i |
| 21 | 0 | 0 | +1 | −1 | i | −i |
| 22 | 1 | 1 | +1 | +1 | i | −i |
| 23 | 1 | 1 | +1 | −1 | i | −i |

TABLE VIA

Parameters reflecting operations to existing PUSCH DM-RS configuration table

| Cyclic Shift Field in uplink-related DCI format | $n_{DMRS,\lambda}^{(2)}$ λ = 0 | λ = 1 | λ = 2 | λ = 3 | $[w^{(\lambda)}(0) \; w^{(\lambda)}(1)]$ λ = 0 | λ = 1 | λ = 2 | λ = 3 |
|---|---|---|---|---|---|---|---|---|
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |
| X1 | 0 | 6 | 3 | 9 | [−1, −1] | [−1, −1] | [−1, 1] | [−1, 1] |
| X2 | 6 | 0 | 9 | 3 | [−1, 1] | [−1, 1] | [−1, −1] | [−1, −1] |
| X3 | 3 | 9 | 6 | 0 | [−1, 1] | [−1, 1] | [−1, −1] | [−1, −1] |
| X4 | 4 | 10 | 7 | 1 | [−1, −1] | [−1, −1] | [−1, −1] | [−1, −1] |
| X5 | 2 | 8 | 5 | 11 | [−1, −1] | [−1, −1] | [−1, −1] | [−1, −1] |
| X6 | 8 | 2 | 11 | 5 | [−1, 1] | [−1, 1] | [−1, 1] | [−1, 1] |
| X7 | 10 | 4 | 1 | 7 | [−1, 1] | [−1, 1] | [−1, 1] | [−1, 1] |
| X8 | 9 | 3 | 0 | 6 | [−1, −1] | [−1, −1] | [−1, 1] | [−1, 1] |

TABLE VIB

Parameters reflecting operations to existing PUSCH DM-RS configuration table

| Cyclic Shift Field in uplink-related DCI format | $\bar{\omega}$ | $n_{DMRS,\lambda}^{(2)}$ λ = 0 | λ = 1 | λ = 2 | λ = 3 | $[w^{(\lambda)}(0) \; w^{(\lambda)}(1)]$ λ = 0 | λ = 1 | λ = 2 | λ = 3 |
|---|---|---|---|---|---|---|---|---|---|
| 000 | 1 | 0 | 6 | 3 | 9 | [1 1] | [1 1] | [1 −1] | [1 −1] |
| 001 | 1 | 6 | 0 | 9 | 3 | [1 −1] | [1 −1] | [1 1] | [1 1] |
| 010 | 1 | 3 | 9 | 6 | 0 | [1 −1] | [1 −1] | [1 1] | [1 1] |
| 011 | 0 | 4 | 10 | 7 | 1 | [1 1] | [1 1] | [1 1] | [1 1] |
| 100 | 0 | 2 | 8 | 5 | 11 | [1 1] | [1 1] | [1 1] | [1 1] |
| 101 | 0 | 8 | 2 | 11 | 5 | [1 −1] | [1 −1] | [1 −1] | [1 −1] |

TABLE VIB-continued

Parameters reflecting operations to existing PUSCH DM-RS configuration table

| Cyclic Shift Field in uplink-related DCI format | $\bar{\omega}$ | $n_{DMRS,\lambda}^{(2)}$ | | | | $[w^{(\lambda)}(0)\ w^{(\lambda)}(1)]$ | | | |
|---|---|---|---|---|---|---|---|---|---|
| | | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 110 | 0 | 10 | 4 | 1 | 7 | [1 −1] | [1 −1] | [1 −1] | [1 −1] |
| 111 | 1 | 9 | 3 | 0 | 6 | [1 1] | [1 1] | [1 −1] | [1 −1] |
| X1 | 1 | 0 | 6 | 3 | 9 | [−1, −1] | [−1,−1] | [−1, 1] | [−1, 1] |
| X2 | 1 | 6 | 0 | 9 | 3 | [−1, 1] | [−1, 1] | [−1,−1] | [−1,−1] |
| X3 | 1 | 3 | 9 | 6 | 0 | [−1, 1] | [−1, 1] | [−1,−1] | [−1,−1] |
| X4 | 0 | 4 | 10 | 7 | 1 | [−1, −1] | [−1,−1] | [−1,−1] | [−1,−1] |
| X5 | 0 | 2 | 8 | 5 | 11 | [−1, −1] | [−1,−1] | [−1,−1] | [−1,−1] |
| X6 | 0 | 8 | 2 | 11 | 5 | [−1, 1] | [−1, 1] | [−1, 1] | [−1, 1] |
| X7 | 0 | 10 | 4 | 1 | 7 | [−1, 1] | [−1, 1] | [−1, 1] | [−1, 1] |
| X8 | 1 | 9 | 3 | 0 | 6 | [−1, −1] | [−1, −1] | [−1, 1] | [−1, 1] |

The exemplary operations shown in the tables above could be similarly performed for the NR (3GPP Rel-15 and beyond, e.g., specification 38.XXX) PUSCH DM-RS configuration table (see Table I), LTE (3GPP Rel-8 and beyond (e.g., specification 36.XXX) or other existing tables.

Exemplary Methods for the Disclosed Technology

Embodiments of the disclosed technology advantageously result in reduced collisions in uplink transmissions based on transmitter-side processing of preamble and reference signals, as described in this patent document.

FIG. 8 shows an example of a wireless communication method 800 for transmitter-side processing of preamble and reference signals. The method 800 includes, at step 810, transmitting, by a wireless device, a message comprising modified symbols that are generated by performing a modification on baseline symbols.

In some embodiments, the baseline symbols comprise preamble symbols, and the modification comprises multiplication by (−1). In other embodiments, the baseline symbols comprise DMRS symbols, and the modification comprises multiplication by (−1). In yet other embodiments, the baseline symbols comprise preamble symbols, and the modification comprises multiplication by a first complex number. In yet other embodiments, the baseline symbols comprise DMRS symbols, and the modification comprises multiplication by a second complex number. In yet other embodiments, the baseline symbols comprise preamble symbols and DMRS symbols, and the modification comprises multiplying the preamble symbols by first complex number and multiplying the DMRS symbols by a second complex number. In an example, the first complex number is 1, and the second complex number is 1. In another example, the first complex number is 1, and the second complex number is −1. In yet another example, the first complex number is −1, the second complex number is i, and i is equal to $\sqrt{-1}$. In yet another example, the first complex number is −1, the second complex number is −i, and i is equal to $\sqrt{-1}$. In yet another example, the first complex number is 1, and the second complex number is selected from constellation points of a quadrature phase shift keying (QPSK) constellation.

In some embodiments, the message include a random access message, and the method 800 further includes the step of receiving, from a network node and in response to transmitting the random access message, a contention resolution message.

In some embodiments, the baseline symbols comprise one or two sequences of four sequences, $w_f(0)$, $w_f(1)$, $w_t(0)$ or $w_t(1)$, across a plurality of antenna ports ($\tilde{p}=0, \ldots, 7$) for a physical uplink shared channel (PUSCH) demodulation reference signal (DM-RS) configuration given by:

| $\tilde{p}$ | CDM group | $\Delta$ | $w_f(k')$ | | $w_t(l')$ | |
|---|---|---|---|---|---|---|
| | | | $k' = 0$ | $k' = 1$ | $l' = 0$ | $l' = 1$ |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

In some embodiments, the baseline symbols comprise one or two sequences of four sequences, $w_f(0)$, $w_f(1)$, $w_t(0)$ and $w_t(1)$, across a plurality of antenna ports ($\tilde{p}=0, \ldots, 11$) for a physical uplink shared channel (PUSCH) demodulation reference signal (DM-RS) configuration given by:

| $\tilde{p}$ | CDM group | $\Delta$ | $w_f(k')$ | | $w_t(l')$ | |
|---|---|---|---|---|---|---|
| | | | $k' = 0$ | $k' = 1$ | $l' = 0$ | $l' = 1$ |
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

In an example, the one sequence include $w_f(0)$ or $w_t(0)$. In another example, the two sequences include $w_t(0)$ and $w_t(1)$. In yet another example, the two sequences include $w_f(0)$ and $w_f(1)$. In yet another example, the modification comprises multiplication by (−1), multiplication by i or multiplication by (−i), where i is equal to $\sqrt{-1}$. In yet another example, the modification comprises multiplication by (−1).

FIG. 9 shows another example of a wireless communication method 900 for transmitter-side processing of preamble and reference signals. This example includes some features and/or steps that are similar to those shown in FIG. 8, and described above. At least some of these features and/or steps may not be separately described in this section. The method 900 includes, at step 910, receiving, by a network node, a message comprising modified symbols that are generated by performing a modification on baseline symbols.

In some embodiments, the message include a random access message, and the method 900 further includes the step of transmitting, to a wireless device and in response to receiving the random access message, a contention resolution message.

In some embodiments, and in the context of methods 800 and 900, communicating the contention resolution message completes a two-step random access procedure between the wireless device and the network node.

In some embodiments, the message comprises a contention-based physical uplink shared channel (PUSCH) transmission. In other embodiments, the message comprises a contention-based physical uplink control channel (PUCCH) transmission.

In some embodiments, the baseline symbols comprise preamble symbols and DMRS symbols, the modification comprises multiplying the preamble symbols by first complex number and multiplying the DMRS symbols by a second complex number, and the method 900 further includes the steps of generating a reconstructed channel estimate based on a sum of a first scaled channel estimate and a second scaled channel estimate, and performing equalization based on the reconstructed channel estimate. In this embodiment, the first scaled channel estimate comprises a first channel estimate multiplied by a third complex number, the first channel estimate is based on modified preamble symbols, the second scaled channel estimate comprises a second channel estimate multiplied by a fourth complex number, and the second channel estimate is based on modified DMRS symbols. In an example, the first and second complex numbers are randomly selected from a first set that comprises [1, 1] and [1, −1], and the third and fourth complex numbers are selected from a second set that comprises [1/2, 1/2] and [1/2, −1/2]. In another example, the first and second complex numbers are randomly selected from a first set that comprises [1, 1] and [1, i], and the third and fourth complex numbers are selected from a second set that comprises [i/(i−1), 11(1−i)] and [11(1−i), 1/(i−1)]. In yet another example, the first and second complex numbers are randomly selected from a first set that comprises [1, 1] and [1, −i], and the third and fourth complex numbers are selected from a second set that comprises [i/(1+i), 1/(1+i)] and [1/(1+i), −1/(1+i)]. In yet another example, the first and second complex numbers are randomly selected from a first set that comprises [1, 1] and [1, x], the third and fourth complex numbers are selected from a second set that comprises [x/(x−1), 1/(1−x)] and [1/(1−x), 1/(x−1)], and x is a point in a quadrature phase shift keying (QPSK) constellation (e.g., a set of points specified as $\{(1+i)/\sqrt{2}, (-1+i)/\sqrt{2}, (-1-i)/V, (1-i)/\sqrt{2}\}$). In yet another example, the first and second complex numbers are selected randomly between [$a_1$, $a_2$] and [$b_1$, $b_2$], and the third and fourth complex numbers are [$b_2/(b_2a_1-b_1a_2)$, $b_1/(b_1a_2-b_2a_1)$] or [$a_2/(b_1a_2-b_2a_1)$, $a_1/(b_2a_1-b_1a_2)$]. In yet another example, three sets of complex numbers are defined as {[1, 1], [1, −1] }, {[1, 1], [1, i] } and {[1, 1], [1, −i] } and each of the three sets is associated with a set index; then, one set is randomly selected from the three sets, the first and second complex numbers are selected randomly from the one set, and the set index is mapped to a resource occasion in which the message is received. For example, the resource occasion comprises at least one of a DMRS antenna port identification (ID), a time and frequency ID, a UE ID or a preamble sequence ID.

In some embodiments, the contention resolution comprises an identification of the wireless device. In other embodiments, the contention resolution comprises a cyclic redundancy check portion that is scrambled using an identification of the wireless device. In yet other embodiments, the contention resolution comprises one or more of a sequence identification of the preamble, reference signal information or resource block information.

Implementations for the Disclosed Technology

Figure 10:
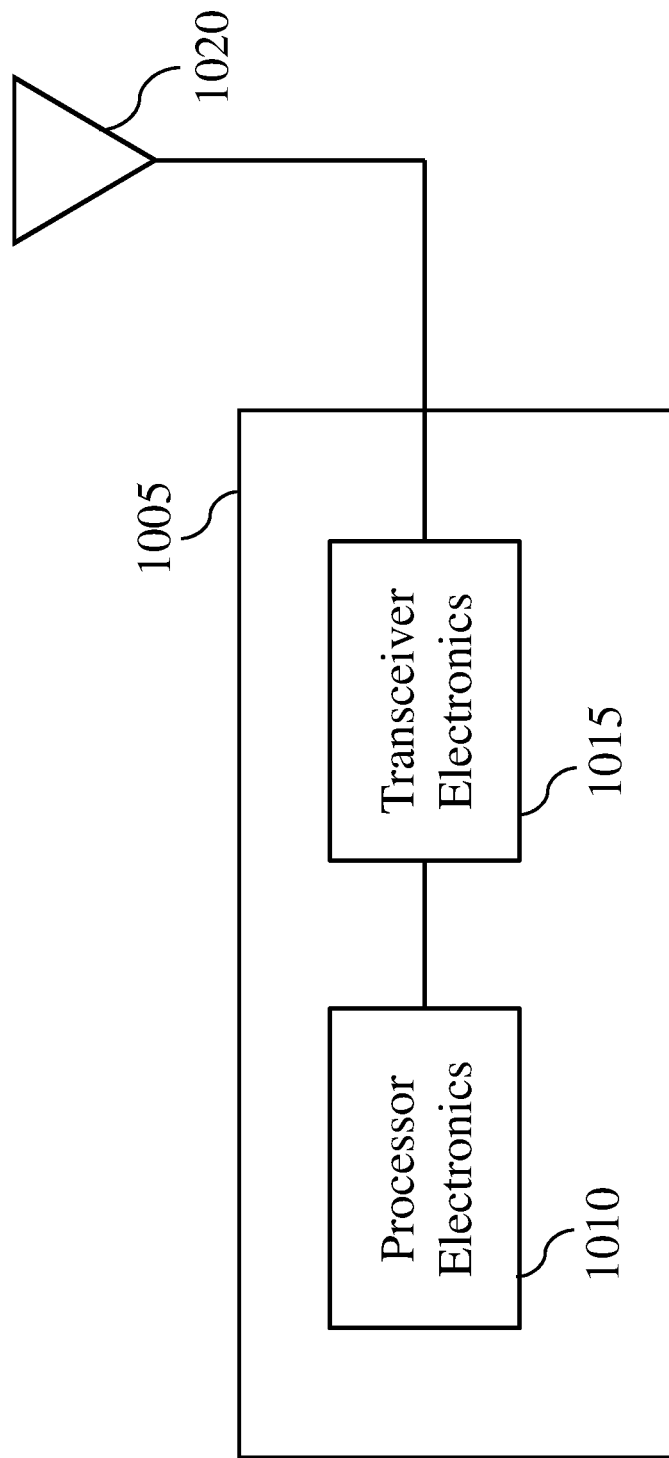
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
transmitting, by a wireless device, a message comprising modified symbols that are generated by performing a modification on baseline symbols, wherein the message comprises a random access message, wherein the baseline symbols comprise at least one of preamble symbols or demodulation reference signal (DMRS) symbols, and wherein the modification comprises multiplication by a first complex number or multiplication by a second complex number; and
receiving, from a network node and in response to transmitting the random access message, a contention resolution message.

2. The method of claim 1, wherein communicating the contention resolution message completes a two-step random access procedure between the wireless device and the network node.

3. The method of claim 1, wherein the message comprises a contention-based physical uplink shared channel (PUSCH) transmission or a contention-based physical uplink control channel (PUCCH) transmission.

4. The method of claim 1, wherein the baseline symbols comprise preamble symbols, and wherein the modification comprises multiplication by −1.

5. The method of claim 1, wherein the baseline symbols comprise demodulation reference signal (DMRS) symbols, and wherein the modification comprises multiplication by −1.

6. The method of claim 1, wherein the first complex number is 1, and wherein the second complex number is 1, −1, i or −i, and wherein i is equal to $\sqrt{-1}$.

7. The method of claim 1, wherein the first complex number is 1, and wherein the second complex number is selected from constellation points of a quadrature phase shift keying (QPSK) constellation.

8. The method of claim 1, wherein the multiplication by the first complex number includes multiplying the preamble symbols by the first complex number and the multiplication by the second complex number includes multiplying the DMRS symbols by the second complex number.

9. A method for wireless communication, comprising:
receiving, by a network node, a message comprising modified symbols that are generated by performing a modification on baseline symbols, wherein the message comprises a random access message, wherein the baseline symbols comprise preamble symbols and demodulation reference signal (DMRS) symbols, wherein the modification comprises multiplying the preamble symbols by first complex number and multiplying the DMRS symbols by a second complex number; and
transmitting, to a wireless device and in response to receiving the random access message, a contention resolution message.

10. The method of claim 9, further comprising:
generating a reconstructed channel estimate based on a sum of a first scaled channel estimate and a second scaled channel estimate; and
performing equalization based on the reconstructed channel estimate,
wherein the first scaled channel estimate comprises a first channel estimate multiplied by a third complex number, wherein the first channel estimate is based on modified preamble symbols, wherein the second scaled channel estimate comprises a second channel estimate multiplied by a fourth complex number, and wherein the second channel estimate is based on modified DMRS symbols.

11. The method of claim 10, wherein the first and second complex numbers are randomly selected from a first set that comprises [1, 1] and [1, −1], and wherein the third and fourth complex numbers are selected from a second set that comprises [1/2, 1/2] and [½, −½].

12. The method of claim 10, wherein the first and second complex numbers are randomly selected from a first set that comprises [1, 1] and [1, i], and wherein the third and fourth complex numbers are selected from a second set that comprises [i/(i−1), 1/(1−i)] and [1/(1−i), 1/(i−1)], and wherein i is equal to $\sqrt{-1}$.

13. The method of claim 10, wherein the first and second complex numbers are randomly selected from a first set that comprises [1, 1] and [1, −i], and wherein the third and fourth complex numbers are selected from a second set that comprises [i/(1+i), 1/(1+i)] and [1/(1+i), −1/(1+i)], and wherein i is equal to $\sqrt{-1}$.

14. The method of claim 10, wherein the first and second complex numbers are randomly selected from a first set that comprises [1, 1] and [1, x], wherein the third and fourth complex numbers are selected from a second set that comprises [x/(x−1), 1/(1−x)] and [1/(1−x), 1/(x−1)], and wherein x is a point in a quadrature phase shift keying (QPSK) constellation.

15. The method of claim 14, wherein the QPSK constellation comprises a set of points specified as $\{(1+i)/\sqrt{2}, (-1+i)/\sqrt{2}, (-1-i)/\sqrt{2}, (1-i)/\sqrt{2}\}$, and wherein i is equal to $\sqrt{-1}$.

16. The method of claim 10, wherein the first and second complex numbers are selected randomly between $[a_1, a_2]$ and $[b_1, b_2]$, and wherein the third and fourth complex numbers are $[b_2/(b_2a_1-b_1a_2), b_1/(b_1a_2-b_2a_1)]$ or $[a_2/(b_1a_2-b_2a_1), a_1/(b_2a_1-b_1a_2)]$.

17. The method of claim 10, wherein three sets of complex numbers are defined as $\{[1, 1], [1, -1]\}$, $\{[1, 1], [1, i]\}$ and $\{[1, 1], [1, -i]\}$, wherein each of the three sets is associated with a set index, wherein one set is randomly selected from the three sets, wherein the first and second complex numbers are selected randomly from the one set, and wherein the set index is mapped to a resource occasion in which the message is received.

18. The method of claim 9, wherein the resource occasion comprises at least one of a DMRS antenna port identification (ID), a time and frequency ID, a UE ID or a preamble sequence ID.

19. The method of claim 9, wherein the contention resolution message comprises at least one of an identification of the wireless device, a cyclic redundancy check portion that is scrambled using an identification of the wireless device, a sequence identification of the preamble, reference signal information, or resource block information.

20. A wireless communications apparatus comprising a processor and a memory, wherein the processor is configured to read code from the memory and implement a method, comprising:
transmitting, by a wireless device, a message comprising modified symbols that are generated by performing a modification on baseline symbols, wherein the message comprises a random access message, wherein the baseline symbols comprise at least one of preamble symbols or demodulation reference signal (DMRS) symbols, and wherein the modification comprises multiplication by a first complex number or multiplication by a second complex number; and
receiving, from a network node and in response to transmitting the random access message, a contention resolution message.

21. The apparatus of claim 20, wherein communicating the contention resolution message completes a two-step random access procedure between the wireless device and the network node.

22. The apparatus of claim 20, wherein the message comprises a contention-based physical uplink shared channel (PUSCH) transmission or a contention-based physical uplink control channel (PUCCH) transmission.

23. A wireless communications apparatus comprising a processor and a memory, wherein the processor is configured to read code from the memory and implement a method, comprising:
receiving, by a network node, a message comprising modified symbols that are generated by performing a modification on baseline symbols, wherein the message comprises a random access message, wherein the baseline symbols comprise preamble symbols and demodulation reference signal (DMRS) symbols, wherein the modification comprises multiplying the preamble symbols by first complex number and multiplying the DMRS symbols by a second complex number; and
transmitting, to a wireless device and in response to receiving the random access message, a contention resolution message.

24. The apparatus of claim 23, wherein the method further comprises:
generating a reconstructed channel estimate based on a sum of a first scaled channel estimate and a second scaled channel estimate; and
performing equalization based on the reconstructed channel estimate,
wherein the first scaled channel estimate comprises a first channel estimate multiplied by a third complex number, wherein the first channel estimate is based on modified preamble symbols, wherein the second scaled channel estimate comprises a second channel estimate multiplied by a fourth complex number, and wherein the second channel estimate is based on modified DMRS symbols.

25. The apparatus of claim 23, wherein the contention resolution message comprises at least one of an identification of the wireless device, a cyclic redundancy check portion that is scrambled using an identification of the wireless device, a sequence identification of the preamble, reference signal information, or resource block information.

* * * * *